United States Patent Office 2,768,501
Patented Oct. 30, 1956

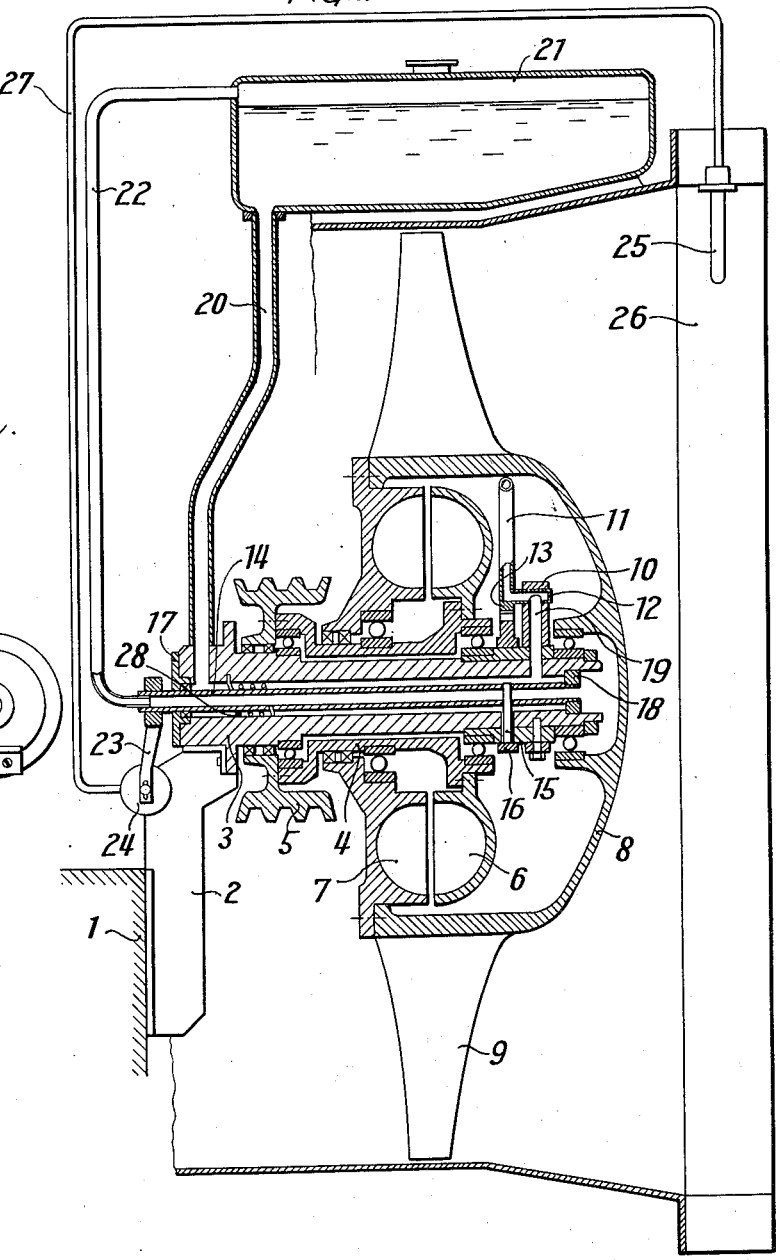

2,768,501

FLUID CONTROL SYSTEM FOR TORUS CHAMBER TYPE HYDRAULIC COUPLINGS

Helmut Müller, Heidenheim, Germany, assignor to J. M. Voith G. m. b. H., Heidenheim, Germany, a corporation of Germany Application April 10, 1952, Serial No. 281,689

6 Claims. (Cl. 60—54)

This invention relates to a hydraulic coupling of the hydrodynamic type in which the filling degree can be varied by means of an adjustable scoop tube so as to vary the speed of the runner relative to the impeller. More particularly the invention relates to hydraulic couplings with a scoop tube, which is arranged in a chamber lying beside the working chamber of the coupling and communicating with this chamber.

In such couplings normally with the adjustable scoop tube also the external oil stream circulation for cooling the working fluid is maintained.

In the case of a coupling of this nature when employed for driving a fan or blower especially the blower of an engine, such external cooling of the oil is not necessary, particularly when the coupling is mounted so that it forms the hub of the fan or blower and is thus subjected directly to the air stream of the fan.

With the foregoing in mind, a particular object of this invention is a provision of a novel fluid coupling in which the coupling between the impeller and runner can be varied by varying the amount of fluid in the coupling.

Another particular object of this invention is the provision of a fluid coupling of the variable fluid level type having a novel means for varying the oil level in the coupling.

A still further object is the provision of a variable speed fluid coupling particularly adapted to serve as the drive for the fan or blower of a large engine such as a diesel engine.

A still further object is the provision of a variable speed fluid coupling so arranged as not to require any external cooling of the fluid medium therein.

In general, the arrangement of this invention includes a fluid source of substantially constant pressure connected with the scooping pipe or scoop tube within the coupling and from which fluid flows when the coupling is being filled up and to which fluid flows when the coupling is being emptied. The pressure of this source is relatively small and the adjustment of the scooping pipe or scoop tube cooperates with the pressure to provide for the above mentioned fluid flow.

According to the preferred form of this invention the fluid source comprises an overhead tank hydraulically connected with the scoop tube whereby the scoop tube is subjected to a substantially constant pressure.

According to another form which this invention may take the source of fluid pressure may comprise a pump which may be normally employed for draining the sump or the like which is arranged for other purposes and the discharge side of which is connected both to the scoop tube and to a reservoir to which the discharge of the pump is normally directed.

Advantageously, according to this invention, particularly when the overhead tank is employed as mentioned above, there is an air connection between the coupling and the space in the tank above the oil therein to provide for an exchange of air between the tank and coupling when the oil level in the coupling varies.

The preferred arrangement of the present invention has the chamber in which the scooping pipe or scoop tube dips directly communicating to the main working chamber of the fluid coupling and integral therewith. This leads to the advantage of an extremely small loss in energy due to the operation of the scoop tube because, normally, there is only fluid flow through the scoop tube during a change in oil level in the coupling.

The objects referred to above and still other objects and advantages of this invention will be more apparent upon reference to the following specification taken in connection with the accompanying drawing, in which there is illustrated more or less diagrammatically a fluid coupling according to the present invention serving as the hub for a fan or blower for drawing air through the cooler of a large engine such as a diesel engine.

Fig. 1 is a longitudinal cross-sectional view of a hydraulic coupling illustrating the invention, and Fig. 1a is a cross-sectional view of the servomotor 24 shown in Fig. 1.

Referring to the drawings somewhat more in detail, 1 represents the cylinder block of the engine and from which there extends arm 2. Rigidly fastened in arm 2 is a hollow pivot shaft 3 extending forwardly therefrom toward the cooler of the engine. Rotatably mounted about shaft 3 is a hollow shaft 4 which carries on its end adjacent the cylinder block the driving belt pulley 5, and at its other end has connected thereto the impeller 6.

Impeller 6 cooperates with a runner or turbine wheel 7 which is fastened to the housing or nave 8 and which is journaled at one side on shaft 4 and at its other side on the outer end of stationary hollow shaft 3. The nave carries the vanes or blades 9 of the fan or blower.

The hollow shaft 3 also has fixed thereto the arm 10 at one end in which is revolvably mounted the scooping pipe or scoop tube 11. Mounted on the scoop tube coaxially with the pivot axis thereof is a gear segment 13 which meshes with a gear 16 rotatably mounted on hollow shaft 3. Gear 16 is coupled by the connecting arm 15 with a central control shaft 14 mounted on the axis of hollow shaft 3 and supported at its opposite ends by the fluid tight closures 17 and 18. Shaft 14 is also hollow to provide communication between its opposite ends.

The scoop tube 11, in the pivot portion 12 thereof, communicates with conduit 19 in arm 10 leading into the interior of hollow shaft 3 and which shaft likewise serves as an oil conduit between the closures 17 and 18.

An overhead tank 21 is provided that communicates through conduit 20 with the interior of shaft 3 so as to be in communication through conduit 19 and pivot 12 with scoop tube 11.

A second conduit 22, and which may be of smaller diameter than conduit 20, connects the overhead tank 21 above the oil level therein with the left end of shaft 14 and therethrough with the hollow space at the right side of the fluid coupling. This last described arrangement serves as a means to supply air to and withdraw air from the fluid coupling during changes in the oil level therein.

The left end of shaft 14 externally of closure 17 carries an arm 23 which is adapted for actuation by the piston or plunger 24 of a thermostat, the heat sensitive element 25 of which is mounted in the cooler 26 and connected with the said piston by a conduit 27.

A spring 28 having one end anchored on hollow shaft 3 and the other end anchored on control shaft 14 provides the desired bias on the shaft against which the described thermostat works.

In operation, the conduit 20 stands under a substantially constant pressure. The scooping pipe or scoop tube 11 dips into the fluid 29 in the coupling to such an extent as exactly to balance the pressure delivered thereto from conduit 20.

Any deflection of the scooping tube from this position of balance will then bring about either filling or emptying of the coupling, according to the direction of deflection of the scoop tube, until the original state of equilibrium has again been established and at which time there will be no further fluid circulation between the overhead tank and the coupling.

Due to the fact that the nave 8 lies directly in the path of the air moved by the fan or blower, and also has a substantial area, no additional cooling of the fluid medium is necessary.

As a fluid medium it is preferred to employ a relatively thin oil rather than the customary rather heavy motor oil, because a separate oil for the coupling will remain cleaner for a longer time.

It will be understood that this invention is susceptible to modification in order to adapt it to different usages and conditions, and, accordingly, it is desired to comprehend such modifications within this invention as may fall within the scope of the appended claims.

I claim:

1. In a fluid coupling having an impeller and a runner, and a housing surrounding the runner and impeller and containing a fluid medium, said housing forming a chamber spaced axially from the working space of the coupling defined by the impeller and runner and freely hydraulically communicating therewith, a scoop tube having a mouth and an open inner end, said scoop tube being so mounted in the chamber as to be adjustable radially therein for variably dipping into the liquid therein, and an external source of fluid under relatively small and substantially constant pressure hydraulically connected with the inner end of said scoop tube, said source of fluid being held at a pressure such that when the scoop tube is adjusted to dip its mouth into the liquid a predetermined amount of liquid will flow through the tube from the chamber to the source, and when the scoop tube mouth is adjusted to dip into the liquid less than the said predetermined amount, liquid will flow through the tube from the source to the chamber.

2. An arrangement as set forth in claim 1 in which the said source of fluid comprises a tank positioned above the coupling.

3. An arrangement as set forth in claim 2 wherein the space in the said tank above the liquid therein is connected with the interior of the coupling for the exchange of air therebetween simultaneously with the exchange of fluid therebetween, thereby aiding in maintaining the pressure from said tank toward said scoop tube mouth relatively small and substantially constant.

4. In a fluid coupling; an impeller and a runner defining between each other the working space of the coupling, a housing secured to said runner and enclosing both the runner and impeller, said housing forming a chamber for the fluid medium of the coupling axially spaced from said working space and freely hydraulically communicating therewith, a scoop tube having a mouth and an open inner end, said scoop tube being radially adjustable in said chamber for variably dipping into the fluid in said chamber and scooping up said fluid, thereby regulating concurrently the level of the fluid in said working space, and a source of fluid under relatively small and substantially constant pressure hydraulically connected with the inner end of said scoop tube for the passage of fluid, said pressure being such that the direction of fluid flow through said scoop tube between said chamber and source can be controlled by small radial adjustment of the scoop tube in the chamber.

5. An arrangement according to claim 4 in which the source of fluid comprises an overhead tank and which includes an air conduit leading from the space in the tank above the liquid level therein to a central position in the said housing.

6. In a fluid coupling; the combination of an impeller and a runner defining between each other the working space of the coupling, a housing secured to said runner and enclosing both the runner and impeller, said housing forming a chamber for the fluid medium of the coupling axially spaced from said working space and freely hydraulically communicating therewith, a scoop tube having a mouth and an open inner end, said scoop tube being radially adjustable in said chamber for variably dipping into the fluid in said chamber and scooping up said fluid, thereby regulating concurrently the level of the fluid in said working space, a source of fluid under relatively small and substantially constant pressure hydraulically connected with the inner end of said scoop tube for the passage of fluid, said pressure being such that the direction of fluid flow through said scoop tube between said chamber and source can be controlled by small radial adjustment of the scoop tube in the chamber.

References Cited in the file of this patent

UNITED STATES PATENTS

| Number | Name | Date |
|---|---|---|
| 1,859,607 | Sinclair | May 24, 1932 |
| 1,881,082 | Kiep | Oct. 4, 1932 |
| 1,881,083 | Kiep | Oct. 4, 1932 |
| 1,975,505 | Föttinger | Oct. 2, 1934 |
| 2,049,673 | Starr | Aug. 4, 1936 |
| 2,281,161 | Kuhns et al. | Apr. 28, 1942 |
| 2,289,440 | Kugel | July 14, 1942 |
| 2,423,812 | Karl et al. | July 8, 1947 |
| 2,459,734 | McCracken | Jan. 18, 1949 |
| 2,508,442 | Becker | May 23, 1950 |
| 2,582,952 | Becker | Jan. 22, 1952 |